US008290746B2

(12) United States Patent
Urmanov et al.

(10) Patent No.: US 8,290,746 B2
(45) Date of Patent: Oct. 16, 2012

(54) EMBEDDED MICROCONTROLLERS CLASSIFYING SIGNATURES OF COMPONENTS FOR PREDICTIVE MAINTENANCE IN COMPUTER SERVERS

(75) Inventors: Aleksey M. Urmanov, San Diego, CA (US); Anton A. Bougaev, La Jolla, CA (US); Darrell D. Donaldson, Lancaster, MA (US)

(73) Assignee: Oracle America, Inc., Redwood Shores, CA (US)

( * ) Notice: Subject to any disclaimer, the term of this patent is extended or adjusted under 35 U.S.C. 154(b) by 516 days.

(21) Appl. No.: 12/495,478

(22) Filed: Jun. 30, 2009

(65) Prior Publication Data
US 2010/0332189 A1 Dec. 30, 2010

(51) Int. Cl.
*G06F 11/22* (2006.01)
*G06F 11/30* (2006.01)

(52) U.S. Cl. ............ 702/186; 702/58; 702/185; 714/25; 714/30; 714/40

(58) Field of Classification Search .................. 702/186, 702/34, 35, 58, 59, 185
See application file for complete search history.

(56) References Cited

U.S. PATENT DOCUMENTS

| 5,966,510 | A * | 10/1999 | Carbonneau et al. ........... 714/44 |
| 6,338,150 | B1 * | 1/2002 | Johnson et al. .................. 714/39 |
| 6,748,305 | B1 * | 6/2004 | Klausner et al. ............. 701/29.4 |
| 6,826,369 | B1 * | 11/2004 | Bondarev et al. ............. 398/107 |
| 7,478,075 | B2 * | 1/2009 | Urmanov et al. ............... 706/25 |
| 7,552,364 | B2 * | 6/2009 | Johnson et al. ............. 714/47.2 |
| 2001/0020251 | A1 * | 9/2001 | Sheikh et al. .................. 709/224 |
| 2006/0026118 | A1 * | 2/2006 | Jung et al. .......................... 707/1 |
| 2006/0026164 | A1 * | 2/2006 | Jung et al. ........................ 707/10 |
| 2008/0126864 | A1 * | 5/2008 | Abdul et al. .................... 714/31 |
| 2011/0072313 | A1 * | 3/2011 | Fuhrmann et al. ........... 714/47.1 |

* cited by examiner

*Primary Examiner* — Hal Wachsman
(74) *Attorney, Agent, or Firm* — Park, Vaughan, Fleming & Dowler LLP; Chia-Hsin Suen

(57) ABSTRACT

Some embodiments of the present invention provide a system that analyzes data from a computer system. During operation, the system obtains the sensor data from a component in the computer system using a set of sensors. Next, the system transmits the sensor data to a microcontroller unit (MCU) coupled to the sensors and stores the sensor data in internal memory of the MCU. Finally, the system assesses the integrity of the component by analyzing the sensor data using a pattern-recognition apparatus in the MCU.

17 Claims, 3 Drawing Sheets

US 8,290,746 B2

EMBEDDED MICROCONTROLLERS CLASSIFYING SIGNATURES OF COMPONENTS FOR PREDICTIVE MAINTENANCE IN COMPUTER SERVERS

BACKGROUND

1. Field

The present embodiments relate to techniques for analyzing sensor data. More specifically, the present embodiments relate to a method and system that uses microcontrollers to overcome service bus bandwidth limitations and perform classification of signatures of components from a computer system without using a central processing unit.

2. Related Art

As electronic commerce becomes more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is important to ensure high availability in such enterprise computing systems.

To achieve high availability, it is necessary to be able to capture unambiguous diagnostic information that can quickly locate faults in hardware or software. If systems perform too little event monitoring, when a problem crops up at a customer site, service engineers may be unable to quickly identify the source of the problem. This can lead to increased down time.

Fortunately, entry-level to high-end computer servers are now equipped with a large number of sensors that measure physical parameters such as temperature, voltage, current, vibration, and acoustics. Software-based monitoring mechanisms also monitor software-related performance parameters, such as processor load, memory and cache usage, system throughput, queue lengths, I/O traffic, and quality of service. Typically, special software analyzes the collected sensor data and issues alerts when there is an anomaly. In addition, it is important to archive historical sensor data to allow long-term monitoring and to facilitate detection of slow system degradation.

Moreover, an increase in the number of components within computer servers has resulted in an increase in sensor density within the computer servers. For example, thousands of sensors may be used to monitor the various components of a large computer server. Dynamic monitoring techniques for computer servers may further require that each sensor be sampled at or above a certain rate. In turn, the use of additional sensors to collect sensor data at high sampling rates has resulted in higher bandwidth demands associated with sampling the sensor data.

However, system buses that collect and transmit the sensor data typically have bandwidth limitations that prevent the sensor data from being sampled beyond a certain rate. For example, sensor data collected using an Inter-Integrated Circuit ($I^2C$) system bus may be limited to 100 kilobits per second (higher speed is available but rarely supported) and may be shared by many devices other than sensors. As a result, an increase in sensor density within a computer server may cause the sampling rate of one or more sensors to decrease. For example, a computer server with an $I^2C$ system bus and thousands of sensors may be so bandwidth-limited that each sensor may only be sampled once a minute or longer. Dynamic monitoring and integrity analysis techniques that require frequent sampling of sensors may thus be impeded by such slow sampling rates.

Hence, what is needed is a technique for overcoming system bus bandwidth limitations associated with collecting sensor data in monitored computer systems.

SUMMARY

Some embodiments of the present invention provide a system that analyzes data from a computer system. During operation, the system obtains the sensor data from sensors within the computer system. Next, the system transmits the sensor data to a microcontroller unit (MCU) coupled to the sensors and stores the sensor data in internal memory of the MCU. Finally, the system assesses the integrity of the component by analyzing the sensor data using a pattern-recognition apparatus in the MCU.

In some embodiments, the system also analyzes the sensor data using a system controller in the computer system.

In some embodiments, analyzing the sensor data using the system controller involves at least one of transmitting a portion of the sensor data to the system controller and managing a fault in the computer system using the system controller.

In some embodiments, the sensor data is analyzed using the system controller if the assessed integrity falls below a threshold.

In some embodiments, analyzing the sensor data using the pattern-recognition apparatus in the MCU involves at least one of:
  (i) constructing a waveform signature of the sensor data;
  (ii) removing outliers in the sensor data;
  (iii) performing feature extraction on the sensor data;
  (iv) normalizing the sensor data;
  (v) performing missing attribute processing on the sensor data; and
  (vi) classifying the component using the sensor data.

In some embodiments, the sensors correspond to microelectromechanical systems (MEMS) sensors.

In some embodiments, the sensor data includes at least one of a load metric, a CPU utilization, an idle time, a memory utilization, a disk activity, a transaction latency, a temperature, a voltage, a fan speed, a current, and a vibration acceleration or displacement.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, microcontroller unit (MCU) internal memory, magnetic and optical storage devices such as disk drives, magnetic tape, CDs (compact discs), DVDs (digital versatile discs or digital video discs), or other media for storing code.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices. When the hardware modules or apparatus are activated, they perform the methods and processes included within them.

Figure 1:
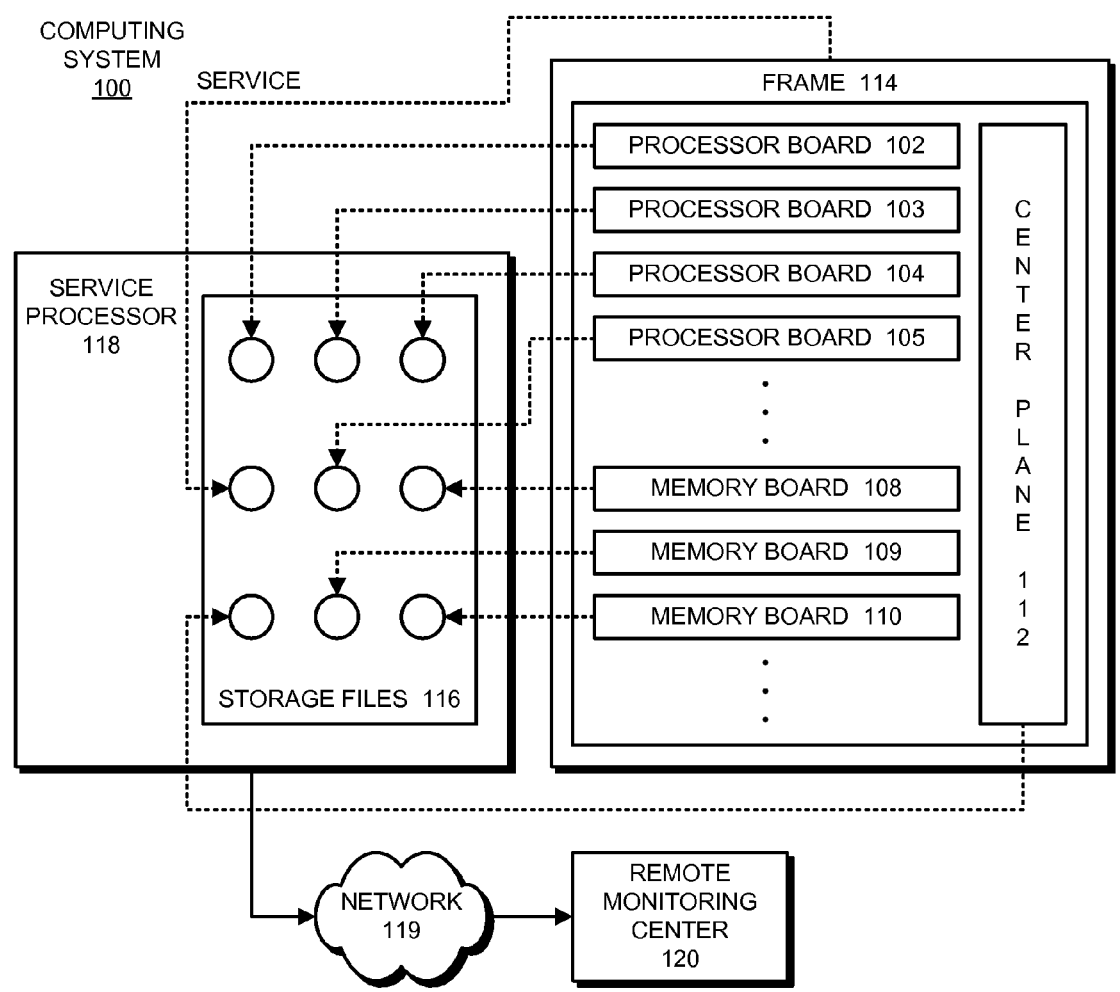
FIG. 1 shows a computer system which includes a service processor for processing sensor signals in accordance with an embodiment.

FIG. 1 shows a computer system which includes a service processor for processing sensor signals in accordance with an embodiment. As is illustrated in FIG. 1, computer system 100 includes a number of processor boards 102-105 and a number of memory boards 108-110, which communicate with each other through center plane 112. These system components are all housed within a frame 114.

In one or more embodiments, these system components and frame 114 are all "field-replaceable units" (FRUs), which are independently monitored as is described below. Note that all major system units, including both hardware and software, can be decomposed into FRUs. For example, a software FRU can include an operating system, a middleware component, a database, or an application.

Computer system 100 is associated with a service processor 118, which can be located within computer system 100, or alternatively can be located in a standalone unit separate from computer system 100. For example, service processor 118 may correspond to a portable computing device, such as a mobile phone, laptop computer, personal digital assistant (PDA), and/or portable media player. Service processor 118 may include a monitoring mechanism that performs a number of diagnostic functions for computer system 100. One of these diagnostic functions involves recording performance parameters from the various FRUs within computer system 100 into a set of storage files 116 located within service processor 118. In one or more embodiments, the performance parameters are recorded into storage files 116 using hardware sensors and software monitors within computer system 100. In one or more embodiments, a dedicated storage file is created and used for each FRU within computer system 100.

The contents of one or more of these storage files 116 can be transferred across network 119 to remote monitoring center 120 for diagnostic purposes. Network 119 can generally include any type of wired or wireless communication channel capable of coupling together computing nodes. This includes, but is not limited to, a local area network (LAN), a wide area network (WAN), a wireless network, and/or a combination of networks. In one or more embodiments, network 119 includes the Internet.

Figure 2:
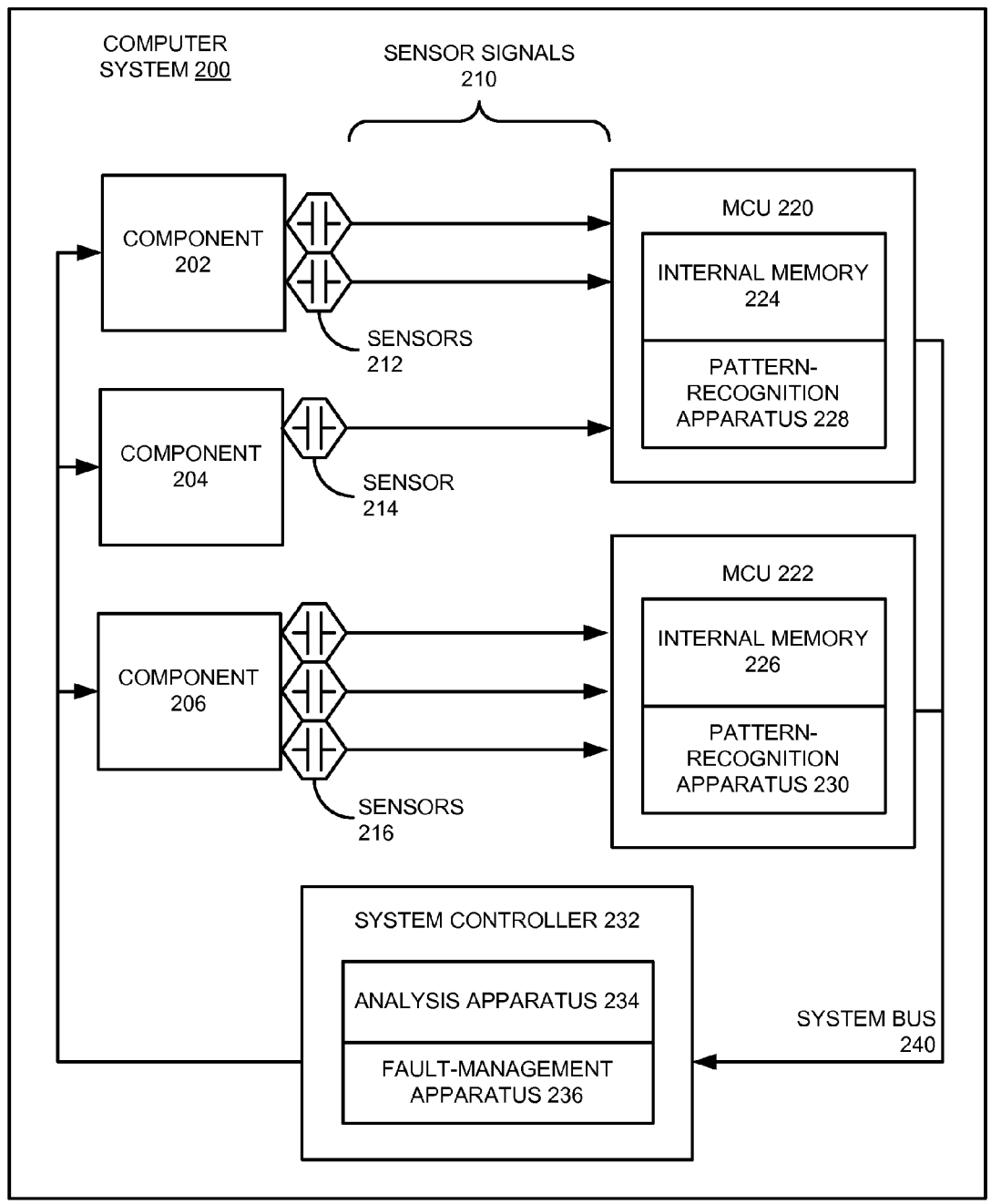
FIG. 2 shows a system for analyzing sensor data from a computer system in accordance with an embodiment.

FIG. 2 shows a system for analyzing sensor data from a computer system 200 in accordance with an embodiment. As shown in FIG. 2, computer system 200 is monitored using a number of sensor signals 210 (e.g., load metric, CPU utilization, idle time, memory utilization, disk activity, transaction latency, temperature, voltage, fan speed, current, vibration acceleration or displacement, etc.) by a set of sensors 212-216. In particular, a number of components 202-206 in computer system 200 are monitored using sensors 212-216. Component 202 is monitored using two sensors 212, component 204 is monitored using one sensor 214, and component 206 is monitored using three sensors 216. Components 202-206 may correspond to fans, processors, power supplies, connectors, hard disk drives (HDDs), ball grid arrays (BGAs), and/or other electronic or electromechanical components in computer system 200.

In one or more embodiments, sensor signals 210 are sent directly from sensors 212-216 to a system controller 232 in computer system 200. System controller 232 may be associated with and/or implemented using a service processor (e.g., service processor 118 of FIG. 1) associated with computer system 200. System controller 232 may analyze the received sensor signals 210 to detect degradation, faults, and/or anomalies in computer system 200.

Alternatively, system controller 232 may reside within a remote monitoring center (e.g., remote monitoring center 120 of FIG. 1) that obtains sensor signals 210 from computer system 200 over a network connection. Moreover, system controller 232 may include functionality to analyze both real-time sensor signals 210 and long-term historical sensor data. For example, system controller 232 may be used to detect anomalies in sensor signals 210 received directly from computer system 200 and/or other monitored computer systems. System controller 232 may also be used in offline detection of anomalies from computer system 200 and/or other monitored computer systems by processing archived and/or compressed sensor data associated with the monitored computer system(s).

Those skilled in the art will appreciate that the overall sampling rate of sensor signals 210 may drop as the number of sensors (e.g., sensors 212-216) in computer system 200 increases. In particular, sensor signals 210 may be collected from computer system 200 and transmitted to system controller 232 using a system bus 240 on computer system 200. However, as an increasing number of sensors are used to collect sensor signals 210, the overall sampling rate associated with the sensors may drop due to bandwidth limitations on system bus 240. For example, a computer server may contain thousands of sensors and an Inter-Integrated Circuit ($I^2C$) system bus for collecting sensor signals 210 from the sensors. While the sensor density of the computer server may be significantly higher than the sensor density of a computer server that is several years older, the bandwidth of the $I^2C$ system bus may not have increased in more than a decade. Consequently, each sensor may only be sampled once a minute or longer.

Such slowdowns in sampling rates of sensors may further reduce the accuracy and robustness of system controller 232. More specifically, techniques used by system controller 232 to dynamically and comprehensively monitor computer system 200 may require frequent sampling of sensor signals 210. However, reduced sampling rates associated with high sensor density on computer system 200 may not allow sensor signals 210 to be sampled at a rate that is optimal for analysis by system controller 232.

System controller 232 may also include computational resource limitations that preclude the accurate, thorough, and/or timely analysis of sensor signals 210. For example, higher priority processes executing on system controller 232 may occupy processor resources on system controller 232 and prevent system controller 232 from analyzing sensor signals 210 in real-time. Such bandwidth and resource limitations may further result in an increase in false alarms, missed alarms, and/or other issues that may adversely affect the efficacy of system controller 232.

To mitigate bandwidth and computational resource limitations and erroneous diagnostics associated with monitoring sensor signals 210 from computer system 200, sensor signals 210 may be sent from sensors 212-216 to a number of microcontroller units (MCUs) 220-222 in computer system 200 instead of to system controller 232. In one or more embodiments, sensors 212-216 correspond to microelectromechanical systems (MEMS) sensors. The use of MEMS sensors may allow multiple sensors 212-216 to be placed in close proximity to both the component 202-206 being monitored and the corresponding MCU 220-222 receiving sensor signals 210 from the sensor. For example, sensors 212-214 may be located on the same printed circuit board (PCB) as MCU 220, while sensors 216 may be located on the same PCB as MCU 222.

In other words, sensor signals 210 may be transmitted from sensors 212-216 to MCUs 220-222 without using system bus 240. Consequently, sampling rates for sensors 212-216 may not be subject to bandwidth limitations on system bus 240. For example, each sensor 212-216 may sample sensor signals 210 at a high (e.g., greater than 1 kHz) rate and transmit the sampled signals using a direct electrical connection (e.g., PCB trace) with the corresponding MCU 220-222.

Those skilled in the art will appreciate that sensors 212-216 may be supported by MCUs 220-222 based on the layout of sensors 212-216 and/or the capabilities of each MCU 220-222. For example, a more powerful MCU may collect sensor signals 210 from a component monitored using tens of sensors. On the other hand, a single MCU (e.g., MCU 220) may collect sensor signals 210 from multiple components monitored using a relatively small number of sensors (e.g., components 202-204).

Upon receiving sensor signals 210 from sensors 212-216, MCUs 220-222 may store sensor signals 210 in internal memory 224-226. MCUs 220-222 may thus provide storage mechanisms for sensor signals 210 in lieu of storage on system controller 232 or elsewhere on computer system 200 (e.g., HDDs, main memory, etc.). Alternatively, some sensor signals 210 may be stored in memory that is external to MCUs 220-222 and/or computer system 200.

MCUs 220-222 may also include functionality to analyze sensor signals 210. In particular, sensor signals 210 received by MCUs 220-222 may be analyzed by pattern-recognition apparatuses 228-230 in MCUs 220-222. Each pattern-recognition apparatus 228-230 may be provided using software that is stored in internal memory 224-226 and executes on a processor in the corresponding MCU 220-222. Pattern-recognition apparatuses 228-230 may process sensor signals 210 by constructing waveform signatures of sensor signals 210, perform feature extraction on sensor signals 210, normalize sensor signals 210, perform missing attribute processing on sensor signals 210, remove outliers in sensor signals 210, and/or classify components 202-206 using sensor signals 210.

In particular, pattern-recognition apparatuses 228-230 may generate multidimensional waveform signatures corresponding to frequency-domain representations of sensor signals 210 using fast Fourier transforms (FFTs), Laplace transforms, discrete Fourier transforms, Z-transforms, and/or any other transform technique. Pattern-recognition apparatuses 228-230 may also analyze the waveform signatures to perform feature extraction (e.g., FFT, principal components analysis (PCA), peak extraction, etc.), normalization, outlier removal, and/or missing attribute processing. Sensor signals 210 may then be stored in internal memory 224-226 as the waveform signatures, extracted features, and/or as unprocessed sensor data.

To classify components 202-206 using sensor signals 210, pattern-recognition apparatuses 228-230 may include classification models of components 202-206. The classification models may be loaded into internal memory 224-226 for use by pattern-recognition apparatuses 228-230 in assessing the integrity of components 202-206. More specifically, the classification models may allow pattern-recognition apparatuses 228-230 to classify components 202-206 as degraded or undegraded and to produce alarms associated with the classifications. In other words, the classification models may facilitate the monitoring of components 202-206 by MCUs 220-222 in lieu of system controller 232, thus offloading the use of computational resources (e.g., processors) in assessing the integrity of components 202-206 and/or computer system 200 from system controller 232 onto MCUs 220-222.

In one or more embodiments, each classification model is associated with waveform signatures for two groups of components: "known good" components with no faults, degradation, or anomalies, and "aged" components that have been degraded under natural or artificial conditions. For example, classification models for cooling fans in computer system 200 may be created using waveform signatures for "known good" cooling fans with no degradation and "aged" cooling fans that have been degraded under accelerated aging conditions.

The classification model may then be created by analyzing the waveform signatures for the two groups of components 202-206. Such analysis may be conducted by system controller 232 and/or an external computer system and may utilize classification techniques such as linear or ridge regression, key pattern extraction, R-cloud classifiers, k-Nearest Neighbor (kNN) classifiers, Radial Basis Function (RBF) networks, Multivariate State Estimation Technique (MSET), and/or Least-Squares Support Vector Machines (LSSVM). R-cloud classifiers and key pattern extraction are described in U.S. Pat. No. 7,478,075 (issued 13 Jan. 2009), by inventors Aleksey M. Urmanov, Anton A. Bougaev, and Kenny C. Gross, entitled "Reducing the Size of a Training Set for Classification," which is incorporated herein by reference.

After loading into internal memory 224-226, the classification models may be used by pattern-recognition apparatuses 228-230 to classify components 202-206. For example, a set of sensor signals 210 monitored from a cooling fan during spin-up and/or spin-down may be used by a pattern-recognition apparatus (e.g., pattern-recognition apparatuses 228-230) to generate a waveform signature of the sensor signals. After generating the waveform signature, the pattern-recognition apparatus may perform feature extraction (e.g., PCA, peak extraction, etc.), missing attribute processing, and/or outlier removal on the waveform extraction. The pattern-recognition apparatus may then classify the waveform signature and/or features using the classification model for the cooling fan and assess the integrity of the cooling fan and/or computer system 200 based on the classification. The result of the classification and/or any associated alarms may then be transmitted from the pattern-recognition apparatus to system controller 232 using system bus 240 for further analysis and/or fault management.

In one or more embodiments, an analysis apparatus 234 in system controller 232 performs additional analysis of sensor signals 210 upon receiving certain alarms from an MCU 220-222. In one or more embodiments, the additional analysis is conducted if the alarms indicate that the assessed integrity of a component 202-206 has fallen below a threshold. For example, analysis apparatus 234 may receive sensor signals 210, waveform signatures, and/or features associated with a component 202-206 from an MCU 220-222 if the component is classified as faulty and/or degrading by the pattern-recognition apparatus 228-230 in the MCU.

In one or more embodiments, analysis apparatus 234 applies a root-cause-analysis technique to sensor signals 210 received from MCUs 220-222 to further assess the integrity of a faulty and/or degrading component. For example, analysis apparatus 234 may use R-cloud classifiers, quadratic classifiers, and/or kNN classifiers to determine the source of a fault or failure in a component. Alternatively, some or all of the root-cause-analysis performed by analysis apparatus 234 may take place on the MCU and/or on an external computer system (e.g., remote monitoring center 120 of FIG. 1).

Furthermore, a fault-management apparatus 236 in system controller 232 may manage degradation, failures, or faults found in one or more components 202-206. For example, fault-management apparatus 236 may enable a technician to quickly replace a degrading component by informing the technician of the type and location of the degrading component within computer system 200. Fault-management apparatus 236 may also reduce the workload and/or otherwise change the mode of operation of computer system 200 to prevent failures from occurring because of faulty and/or degrading components. Alternatively, if a fault is found in one or more sensors 212-216 instead of in a component 202-206, fault-management apparatus 236 may generate replacement signals in lieu of the sensors' faulty signals to maintain normal operation in computer system 200.

Those skilled in the art will appreciate that the operation of MCUs 220-222 may be automatically or manually initiated. For example, system controller 232 may initiate the sampling, transmission, storage, and processing of sensor signals 210 through requests to MCUs 220-222. On the other hand, sensors 202-206 and/or MCUs 220-222 may periodically or continually sample, transmit, store, and/or process sensor signals 210 independently of requests made by system controller 232.

Figure 3:
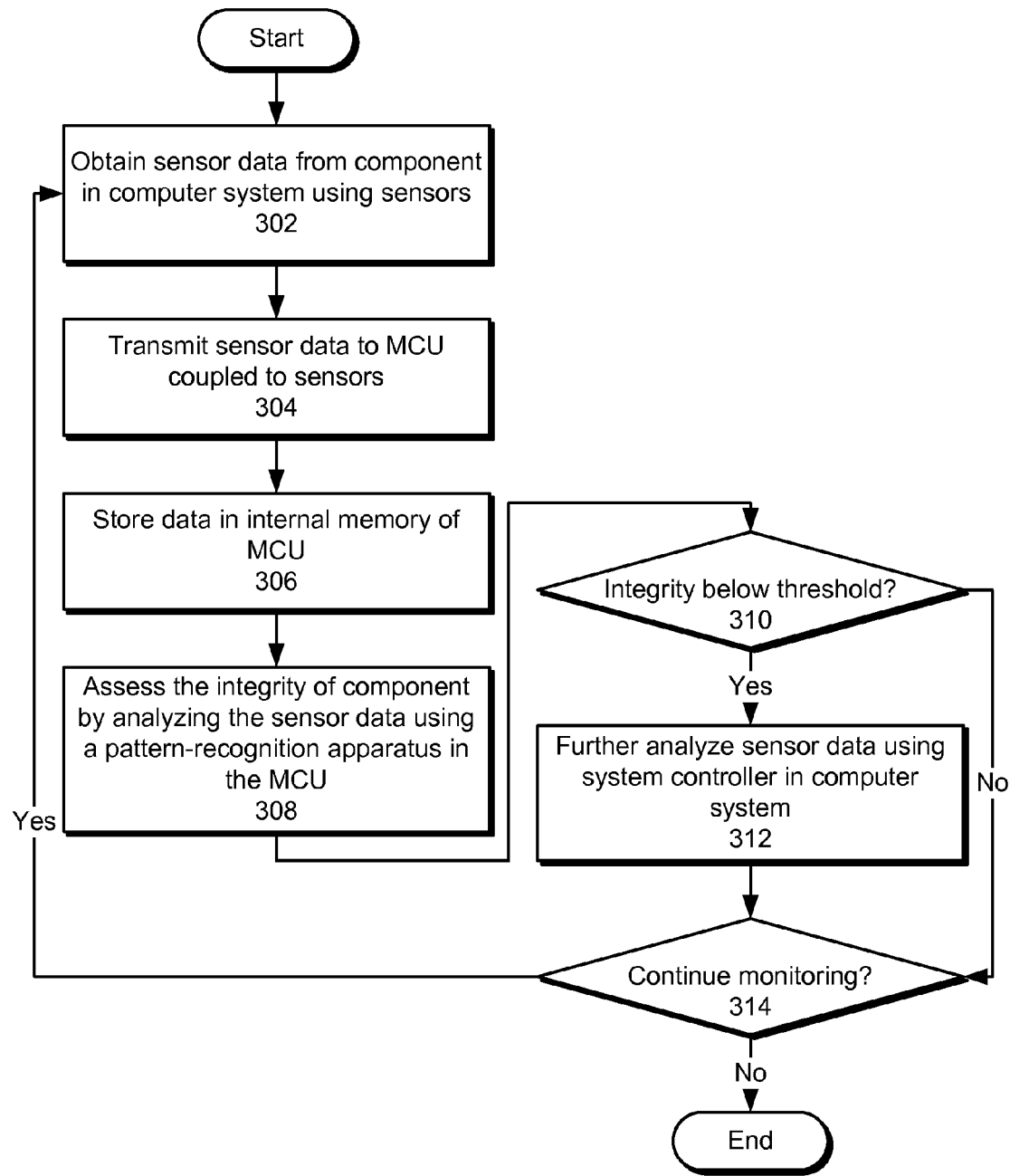
FIG. 3 shows a flowchart illustrating the process of analyzing sensor data from a computer system in accordance with an embodiment.

FIG. 3 shows a flowchart illustrating the process of analyzing sensor data from a computer system in accordance with an embodiment. In one or more embodiments, one or more of the steps may be omitted, repeated, and/or performed in a different order. Accordingly, the specific arrangement of steps shown in FIG. 3 should not be construed as limiting the scope of the technique.

First, the sensor data is obtained from a component in the computer system using a set of sensors (operation 302). The component may correspond to a fan, processor, power supply, connector, HDD, BGA, and/or other electrical or electromechanical component in the computer system. The sensor data may include sensor measurements of load metric, CPU utilization, idle time, memory utilization, disk activity, transaction latency, temperature, voltage, fan speed, current, vibration acceleration or displacement, and/or other telemetry variables from the computer system. Furthermore, the sensor data may be obtained using a set of MEMS sensors.

The sensor data may then be transmitted to an MCU coupled to the sensors (operation 304) and stored in internal memory of the MCU (operation 306). For example, the sensor data may be sampled at a high rate by the sensors and transmitted to the MCU using a direct electrical connection (e.g., PCB trace) between the sensors and the MCU. In other words, the transmission of sensor data from the sensors to the MCU may involve the direct transfer of electrons between the sensors and the MCU. Such direct electron transfer between the sensors and the MCU may allow the sensor data to be collected and stored by the MCU without using a system controller and/or other system resources on the computer system. The MCU may be dedicated to monitoring sensor data from the component, or the MCU may be shared between the component and other components in the computer system.

Next, the integrity of the component is assessed by analyzing the sensor data using a pattern-recognition apparatus in the MCU (operation 308). To analyze the sensor data, the pattern-recognition apparatus may construct a waveform signature of the sensor data, remove outliers in the sensor data, perform feature extraction on the sensor data, normalize the sensor data, perform missing attribute processing on the sensor data, and/or classify a component in the computer system using the sensor data. In other words, the pattern-recognition apparatus may correspond to one or more software modules on the MCU that perform signal processing and/or statistical analysis on the sensor data.

The assessed integrity of the component may fall below a threshold (operation 310). For example, the assessed integrity may fall below a threshold of acceptability if the pattern-recognition apparatus classifies the component as faulty or degraded based on analysis of the sensor data. If the integrity is below the threshold, the sensor data may be further analyzed using a system controller in the computer system (operation 312). In particular, the MCU may transmit an alarm and some or all of the sensor data to the system controller for root-cause-analysis of faults, degradation, and/or anomalies in the component. The system controller may additionally manage a fault in the component after the fault is identified. For example, the system controller may notify a technician of the fault, change the mode of operation of the computer system, generate a replacement signal for a faulty sensor, and/or otherwise take steps to prevent the fault from causing a failure in the computer system.

The component may continue to be monitored (operation 314) regardless of the assessed integrity found in operation 310. For example, an undegraded component may continue to be monitored to detect the onset of degradation in the component, or a faulty component may continue to be monitored to ensure that the fault does not worsen or result in a failure. If monitoring is to continue, sensor data is continually obtained from the component using the sensors (operation 302), transmitted to the MCU (operation 304), and stored in internal memory of the MCU (operation 306). A pattern-recognition apparatus in the MCU may then assess the integrity of the computer system by analyzing the sensor data (operation 308). If the assessed integrity falls below a threshold (operation 310), the sensor data is further analyzed using the system controller (operation 312) to prevent failures from occurring in the computer system. Operations 302-312 may continue until the component is replaced or no longer used and/or the computer system is no longer operating.

The use of MCUs may thus mitigate or eliminate bandwidth and/or computational resource limitations associated with transmitting, storing, and analyzing the sensor data using system resources (e.g., system controller, storage, etc.) on the computer system. In particular, the direct transmission of sensor data between sensors and MCUs may bypass bandwidth limitations on the system bus of the computer system that may otherwise limit the overall sampling rate of the sensors. Likewise, the storage and analysis of the sensor data on the MCUs may allow degradation, faults, and/or anomalies in the computer system to be detected without adversely impacting the normal operation of the computer system. Finally, the real-time classification of components and generation of alarms may improve reliability and serviceability by enabling quick and efficient responses to faults by the system controller and/or technician.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for analyzing sensor data from a computer system, comprising:
    obtaining the sensor data from a component in the computer system using a set of sensors;
    transmitting the sensor data to a microcontroller unit (MCU) coupled to the sensors;
    storing the sensor data in internal memory of the MCU;
    assessing the integrity of the component by analyzing the sensor data using a pattern-recognition apparatus in the MCU; and
    further analyzing the sensor data using a system controller if the assessed integrity falls below a threshold.

2. The method of claim 1, wherein the system controller is in the computer system.

3. The method of claim 2, wherein further analyzing the sensor data using the system controller involves at least one of:
    transmitting a portion of the sensor data to the system controller; and
    managing a fault in the computer system using the system controller.

4. The method of claim 1, wherein analyzing the sensor data using the pattern-recognition apparatus in the MCU involves at least one of:
    constructing a waveform signature of the sensor data;
    removing outliers in the sensor data;
    performing feature extraction on the sensor data;
    normalizing the sensor data;
    performing missing attribute processing on the sensor data; and
    classifying the component using the sensor data.

5. The method of claim 1, wherein the sensors correspond to microelectromechanical systems (MEMS) sensors.

6. The method of claim 1, wherein the sensor data comprises at least one of:
    a load metric;
    a CPU utilization;
    an idle time;
    a memory utilization;
    a disk activity;
    a transaction latency;
    a temperature;
    a voltage;
    a fan speed;
    a current; and
    a vibration acceleration or displacement.

7. A system for analyzing sensor data from a computer system, comprising:
    a set of sensors configured to obtain the sensor data from a component in the computer system; and
    a microcontroller unit (MCU) coupled to the sensors, comprising:
        internal memory configured to store the sensor data; and
        a pattern-recognition module configured to assess the integrity of the component by analyzing the sensor data using a pattern-recognition apparatus in the MCU,
    wherein a system controller is configured to further analyze the sensor data if the assessed integrity falls below a threshold.

8. The system of claim 7, further comprising the system controller.

9. The system of claim 8, wherein further analyzing the sensor data using the system controller involves at least one of:
    transmitting a portion of the sensor data to the system controller; and
    managing a fault in the computer system using the system controller.

10. The system of claim 9, wherein the portion of the sensor data is transmitted to the system controller using a system bus on the computer system.

11. The system of claim 7, wherein the pattern-recognition apparatus in the MCU is configured to analyze the sensor data by:
    constructing a waveform signature of the sensor data;
    removing outliers in the sensor data;
    performing feature extraction on the sensor data;
    normalizing the sensor data;
    performing missing attribute processing on the sensor data; and
    classifying the component using the sensor data.

12. The system of claim 7, wherein the sensors correspond to microelectromechanical systems (MEMS) sensors.

13. The system of claim 7, wherein the sensor data comprises at least one of:
    a load metric;
    a CPU utilization;
    an idle time;
    a memory utilization;
    a disk activity;
    a transaction latency;
    a temperature;
    a voltage;
    a fan speed;
    a current; and
    a vibration acceleration or displacement.

14. A non-transitory computer-readable storage medium storing instructions that when executed by a computer cause the computer to perform a method for analyzing sensor data from a computer system, the method comprising:
    obtaining the sensor data from a component in the computer system using a set of sensors;
    transmitting the sensor data to a microcontroller unit (MCU) coupled to the sensors;
    storing the sensor data in internal memory of the MCU;
    assessing the integrity of the component by analyzing the sensor data using a pattern-recognition apparatus in the MCU; and
    further analyzing the sensor data using a system controller if the assessed integrity falls below a threshold.

15. The non-transitory computer-readable storage medium of claim 14,
    wherein the system controller is in the computer system.

16. The non-transitory computer-readable storage medium of claim 15, wherein further analyzing the sensor data using the system controller involves at least one of:
- transmitting a portion of the sensor data to the system controller; and
- managing a fault in the computer system using the system controller.

17. The non-transitory computer-readable storage medium of claim 14, wherein analyzing the sensor data using the pattern-recognition apparatus in the MCU involves at least one of:
- constructing a waveform signature of the sensor data;
- removing outliers in the sensor data;
- performing feature extraction on the sensor data;
- normalizing the sensor data;
- performing missing attribute processing on the sensor data; and
- classifying the component using the sensor data.

* * * * *

UNITED STATES PATENT AND TRADEMARK OFFICE
CERTIFICATE OF CORRECTION

PATENT NO. : 8,290,746 B2
APPLICATION NO. : 12/495478
DATED : October 16, 2012
INVENTOR(S) : Aleksey M. Urmanov et al.

Page 1 of 1

It is certified that error appears in the above-identified patent and that said Letters Patent is hereby corrected as shown below:

On the title page item (75) (at column 1, Inventors:), please delete the name "Darrell" and replace with the name --Darrel--

Signed and Sealed this
Twenty-ninth Day of January, 2013

David J. Kappos
*Director of the United States Patent and Trademark Office*